(12) United States Patent
Baek et al.

(10) Patent No.: US 11,885,385 B2
(45) Date of Patent: Jan. 30, 2024

(54) ELECTROMECHANICAL BRAKE

(71) Applicant: HL MANDO CORPORATION, Gyeonggi-do (KR)

(72) Inventors: Seungtae Baek, Gyeonggi-do (KR); Joonkyu Song, Gyeonggi-do (KR); Kyungho Jung, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 60 days.

(21) Appl. No.: 17/581,722

(22) Filed: Jan. 21, 2022

(65) Prior Publication Data
US 2022/0235839 A1     Jul. 28, 2022

(30) Foreign Application Priority Data

Jan. 25, 2021   (KR) .................. 10-2021-0010117

(51) Int. Cl.
| | | |
|---|---|---|
| F16D 65/18 | (2006.01) | |
| F16D 65/56 | (2006.01) | |
| F16D 65/00 | (2006.01) | |
| F16D 55/227 | (2006.01) | |
| F16D 66/00 | (2006.01) | |
| F16D 55/00 | (2006.01) | |

(52) U.S. Cl.
CPC ......... *F16D 65/567* (2013.01); *F16D 55/227* (2013.01); *F16D 65/0068* (2013.01); *F16D 65/0081* (2013.01); *F16D 2055/0016* (2013.01); *F16D 2055/0037* (2013.01); *F16D 2066/005* (2013.01)

(58) Field of Classification Search
CPC .............. F16D 55/227; F16D 65/0068; F16D 65/0081; F16D 65/567; F16D 2055/0016; F16D 2055/0037; F16D 2066/005
USPC ................................ 188/72.2–72.8, 156–164
See application file for complete search history.

(56) References Cited

U.S. PATENT DOCUMENTS

| | | | |
|---|---|---|---|
| 11,255,394 B2* | 2/2022 | Sandberg | ................ F16D 65/18 |
| 2010/0193302 A1* | 8/2010 | Schumann | .............. F16D 65/18 |
| | | | 188/105 |
| 2013/0008749 A1* | 1/2013 | Sandberg | ................ F16D 65/18 |
| | | | 29/446 |
| 2022/0025947 A1* | 1/2022 | Baek | ..................... F16D 65/183 |
| 2022/0242384 A1* | 8/2022 | Baek | ..................... F16D 66/026 |

* cited by examiner

*Primary Examiner* — Christopher P Schwartz
(74) *Attorney, Agent, or Firm* — Ladas & Parry, LLP

(57) ABSTRACT

Disclosed herein a electromechanical brake includes a power converter including a nut provided in a cylinder portion of a caliper housing slidably coupled to a carrier and configured to rotate by receiving a driving force from an actuator, and a spindle connected to the nut and configured to move forward or backward by rotation of the nut in a first direction or a second direction; a pressing member coupled to a front side of the spindle and configured to press a pad plate; and a position adjuster screwed into the cylinder portion so that the power converter is mounted and configured to adjust a relative position of the caliper housing in response to an operation of the power converter.

10 Claims, 11 Drawing Sheets

ELECTROMECHANICAL BRAKE

CROSS-REFERENCE TO RELATED APPLICATION(S)

This application is based on and claims priority under 35 U.S.C. § 119 to Korean Patent Application No. 10-2021-0010117, filed on Jan. 25, 2021 in the Korean Intellectual Property Office, the disclosure of which is incorporated herein by reference in its entirety.

TECHNICAL FIELD

The disclosure relates to an electromechanical brake, and more particularly, to an electromechanical brake for realizing braking of a vehicle using rotational driving force of a motor.

BACKGROUND

Vehicles are essentially equipped with a brake system for performing braking, and various types of brake systems have been proposed for a safety of drivers and passengers.

In a conventional brake system, a method of supplying a hydraulic pressure required for braking to wheel cylinders using a mechanically connected booster when a driver depresses a brake pedal has been mainly used. However, as a next-generation brake system, an electromechanical brake system that receives a driver's intention to brake as an electric signal and operates an electronic device such as a motor based on the electronic signal to provide braking force for a vehicle is being been developed.

Such an electromechanical brake system converts rotational force of a motor into linear motion through the motor and a speed reducer to provide a clamping pressure of a brake disc, thereby performing a service brake and a parking brake of a vehicle.

On the other hand, a friction pad of a pad plate that directly contacts and presses a brake disc of a vehicle is gradually abraded according to the repeated braking operations of the vehicle. To maintain braking performance of a vehicle despite wear of a friction pad, compensation for the wear of the friction pad wear is required. However, the compensation for the wear of the friction pad causes that the size or axial length of a brake system is increased, so that applicability of the vehicle is deteriorated.

SUMMARY

An aspect of the disclosure is to provide an electromechanical brake capable of maintaining and improving braking performance of a vehicle despite wear of a friction pad attached to a pad plate.

Another aspect of the disclosure is to provide an electromechanical brake capable of improving applicability of a vehicle by reducing size and weight, and promoting space utilization of the vehicle.

Another aspect of the disclosure is to provide an electromechanical brake capable of easily compensating for wear of a friction pad with a simple structure.

Additional aspects of the disclosure will be set forth in part in the description which follows and, in part, will be obvious from the description, or may be learned by practice of the disclosure.

In accordance with an aspect of the disclosure, an electromechanical brake includes a power converter including a nut provided in a cylinder portion of a caliper housing slidably coupled to a carrier and configured to rotate by receiving a driving force from an actuator, and a spindle connected to the nut and configured to move forward or backward by rotation of the nut in a first direction or a second direction; a pressing member coupled to a front side of the spindle and configured to press a pad plate; and a position adjuster screwed into the cylinder portion so that the power converter is mounted and configured to adjust a relative position of the caliper housing in response to an operation of the power converter.

The position adjuster may include a transfer portion provided between the power converter and the cylinder portion; a first screw thread formed on an outer circumferential surface of the transfer portion; a second screw thread formed on an inner circumferential surface of the cylinder portion and meshing with the first screw thread; and an adjuster configured to rotate the transfer portion in the first direction or the second direction by rotation of the nut to move backward or forward a relative position of the caliper housing with respect to the transfer portion.

The transfer portion may be provided in a hollow cylindrical shape to surround an outer side of the nut to be spaced apart from the nut by a predetermined interval.

The adjuster may include a first protrusion protruding from the nut; and a second protrusion formed to protrude from the transfer portion and configured to move the relative position of the caliper housing backward when the nut rotates in the first direction by being caught by the first protrusion to induce the first direction rotation of the nut and the transfer portion.

A first angle between the first protrusion and the second protrusion in a braking release state of a vehicle may be greater than a second angle at which the first protrusion rotates from the braking release state of the vehicle to a braking state of a vehicle.

The first protrusion may be formed to protrude from an outer circumferential surface of the nut to be spaced apart from an inner circumferential surface of the transfer portion, and the second protrusion is formed to protrude from the inner circumferential surface of the transfer portion to be spaced apart from the outer circumferential surface of the nut.

The electromechanical brake may further include an electronic control unit (ECU) configured to control an operation of the actuator; and a detector configured to measure fastening force between the pad plate and the disk rotating together with a wheel of a vehicle.

The pressing member may be press-fitted or bolted to the front side of the spindle in order to move together with the spindle.

The pressing member may be provided with an anti-rotation means so that rotation thereof is restricted, the anti-rotation means may include an anti-rotation groove or protrusion formed in a front of the pressing member facing the pad plate; and a rotation prevention protrusion or groove formed on a rear side of the pad plate facing the pressing member, the rotation prevention protrusion or groove matching the anti-rotation groove or protrusion.

The electromechanical brake may further include a boot provided to prevent an inflow of foreign substances into the cylinder portion of the caliper housing.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, the embodiments of the disclosure will be described in detail with reference to accompanying drawings. It should be understood that the terms used in the specification and the appended claims should not be construed as limited to general and dictionary meanings, but interpreted based on the meanings and concepts corresponding to technical aspects of the disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
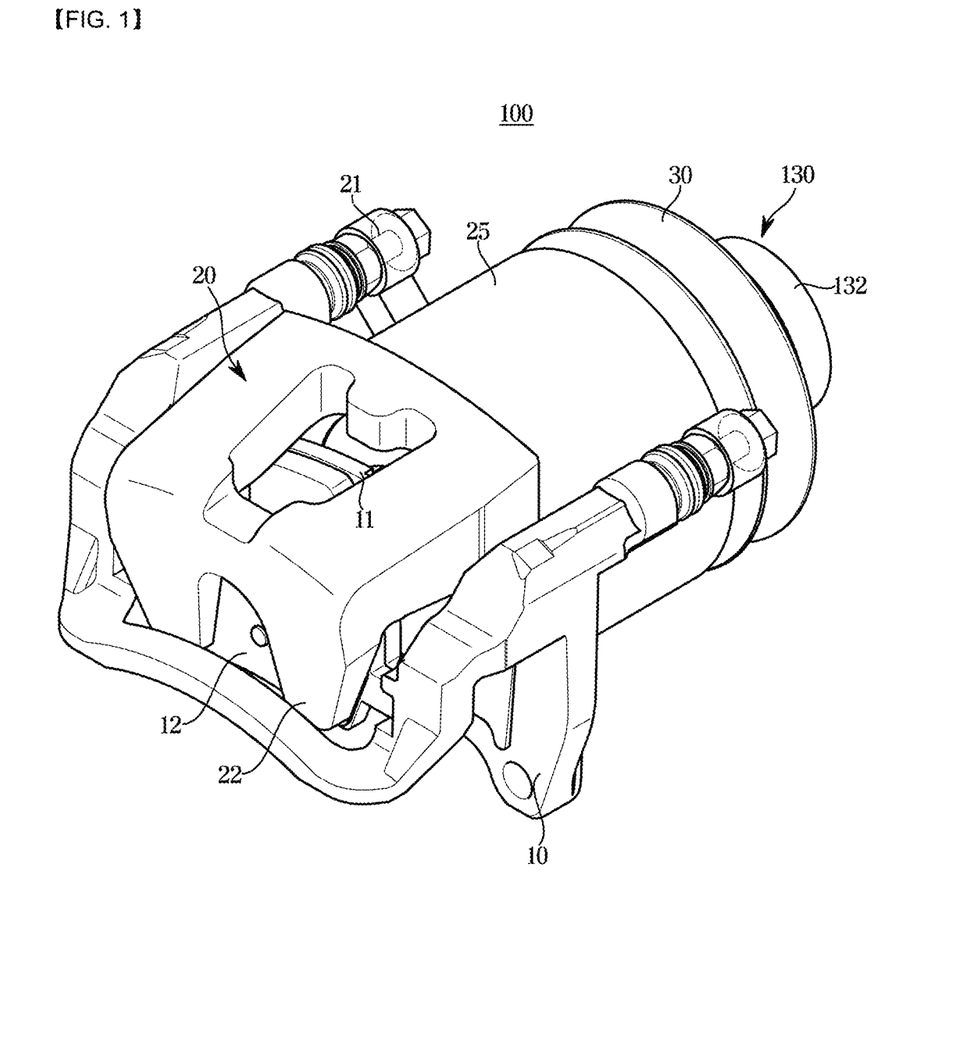
FIG. 1 is a perspective view illustrating an electromechanical brake according to an embodiment of the disclosure.
Figure 2:
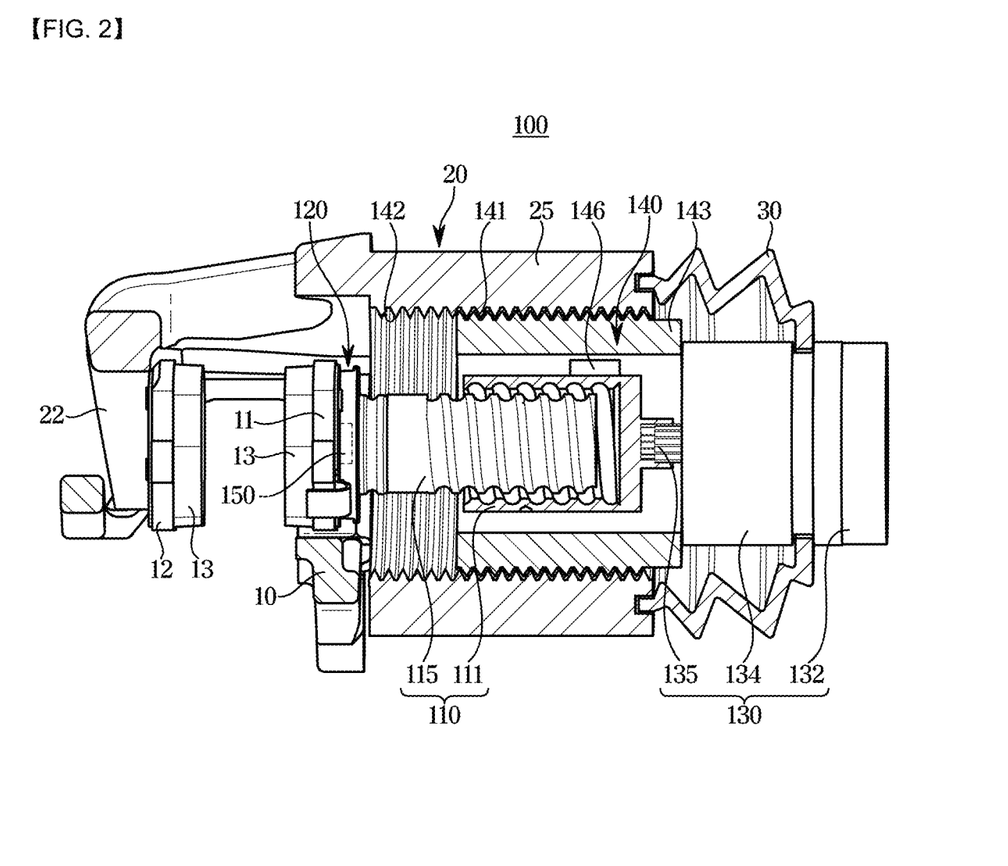
FIG. 2 is a side cross-sectional view illustrating an electromechanical brake according to an embodiment of the disclosure.

FIG. 1 is a perspective view illustrating an electromechanical brake according to an embodiment of the disclosure, and FIG. 2 is a side cross-sectional view illustrating an electromechanical brake according to an embodiment of the disclosure.

Referring to FIGS. 1 and 2, an electromechanical brake 100 according to an embodiment of the disclosure may include a carrier 10 in which a pair of pad plates 11 and 12 are installed to press a disk (not shown) rotating together with wheels of the vehicle, a caliper housing 20 slidably installed on the carrier 10 to operate the pair of pad plates 11 and 12, an actuator 130 that generates and provides driving force for moving the pair of pad plates 11 and 12, a power converter 110 that receives a rotational driving force provided from the actuator 130 and converts the rotational driving force into a linear motion to implement forward and backward movement of the pair of pad plates 11 and 12, a pressing member 120 coupled to a spindle 115 of the power converter 110 to press the pad plate 11, a position adjuster 140 that compensates for wear of friction pads 13 attached to the pair of pad plates 11 and 12 by adjusting a position of the caliper housing 20 with respect to the power converter 110, a detector 150 that measures adhesive force between the disk and the pair of pad plates 11 and 12 or fastening force of the pair of pad plates 11 and 12, and an electronic control unit (ECU) (not shown) that controls an operation of the actuator based on information provided from the detector 150.

The pair of pad plates 11 and 12 is provided with the friction pad 13 attached to an inner surface thereof, respectively. The pair of pad plates 11 and 12 includes the inner pad plate 11 arranged to contact the pressing member 120 and the outer pad plate 12 arranged to contact a finger portion 22 of the caliper housing 20, which will be described later, and is slidably installed on the carrier 10. In other words, the pair of pad plates 11 and 12 are installed on the carrier 10 fixed to a vehicle body and move forward and backward toward both sides of the disk to perform a braking operation.

The caliper housing 20 includes the finger portion 22 bent downwardly on a front side (left side with reference to FIG. 2) to operate the outer pad plate 12, and a cylinder portion 25 including the power converter 110 and the position adjuster 140. The caliper housing 20 is slidably fastened to the carrier 10 through the guide rod 21. The cylinder portion 25 and the finger portion 22 are integrally formed. The caliper housing 20 slides from the carrier 10 and moves toward the disk side by reaction force caused by pressing of the inner pad plate 11 when the vehicle is braked. In addition, the outer pad plate 12 by the finger portion 22 according to the movement of the caliper housing 20 may approach the disk side, thereby pressing the disk.

On the other hand, the cylinder portion 25 is provided in a hollow shape through which front and rear thereof are penetrated. On an inner circumferential surface of the cylinder portion 25 may be formed a second screw thread 142 that meshes with a first screw thread 141 formed in a transfer portion 143 of the position adjuster 140 to be described later. The structure in which the transfer portion 143 is screwed with the cylinder portion 25 will be described again below.

Figure 3:
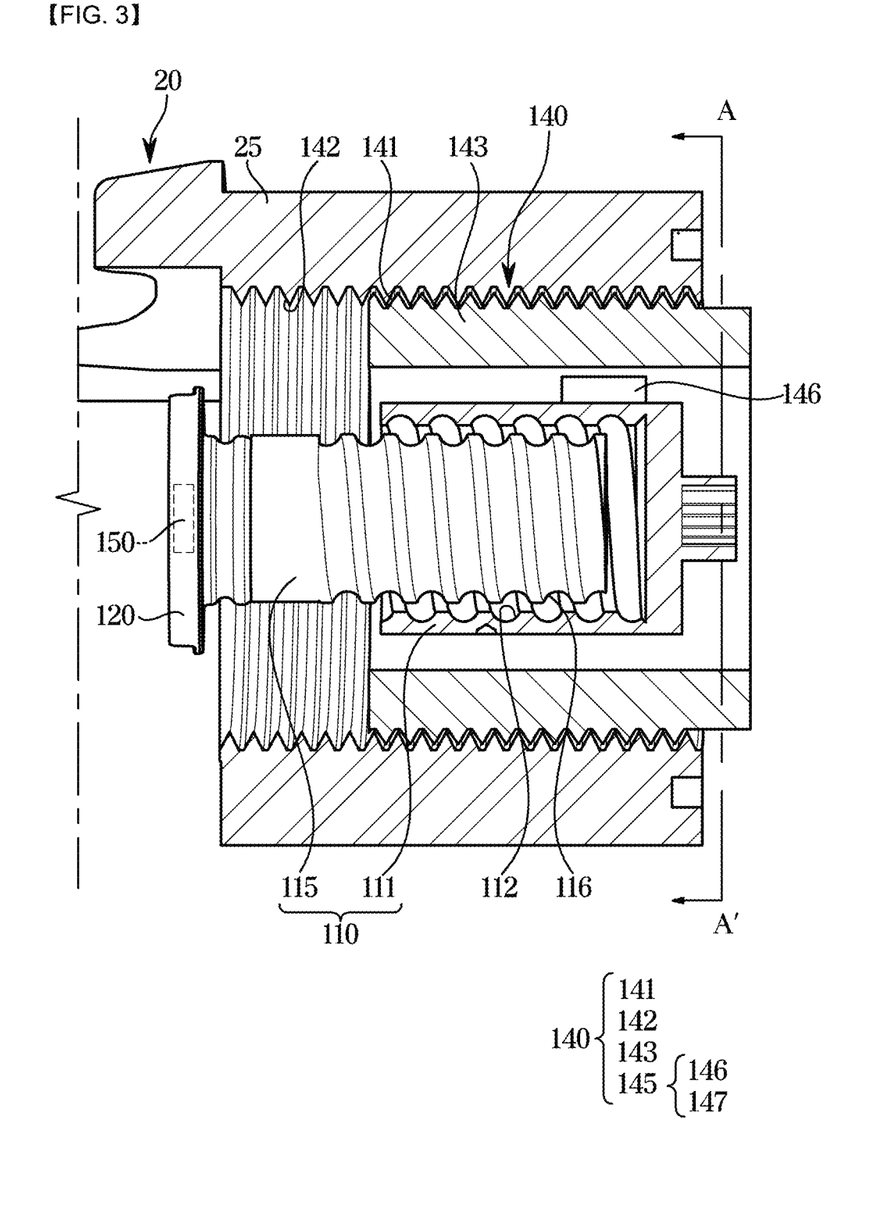
FIG. 3 is an enlarged side cross-sectional view illustrating a main part of an electromechanical brake according to an embodiment of the disclosure.
Figure 4:
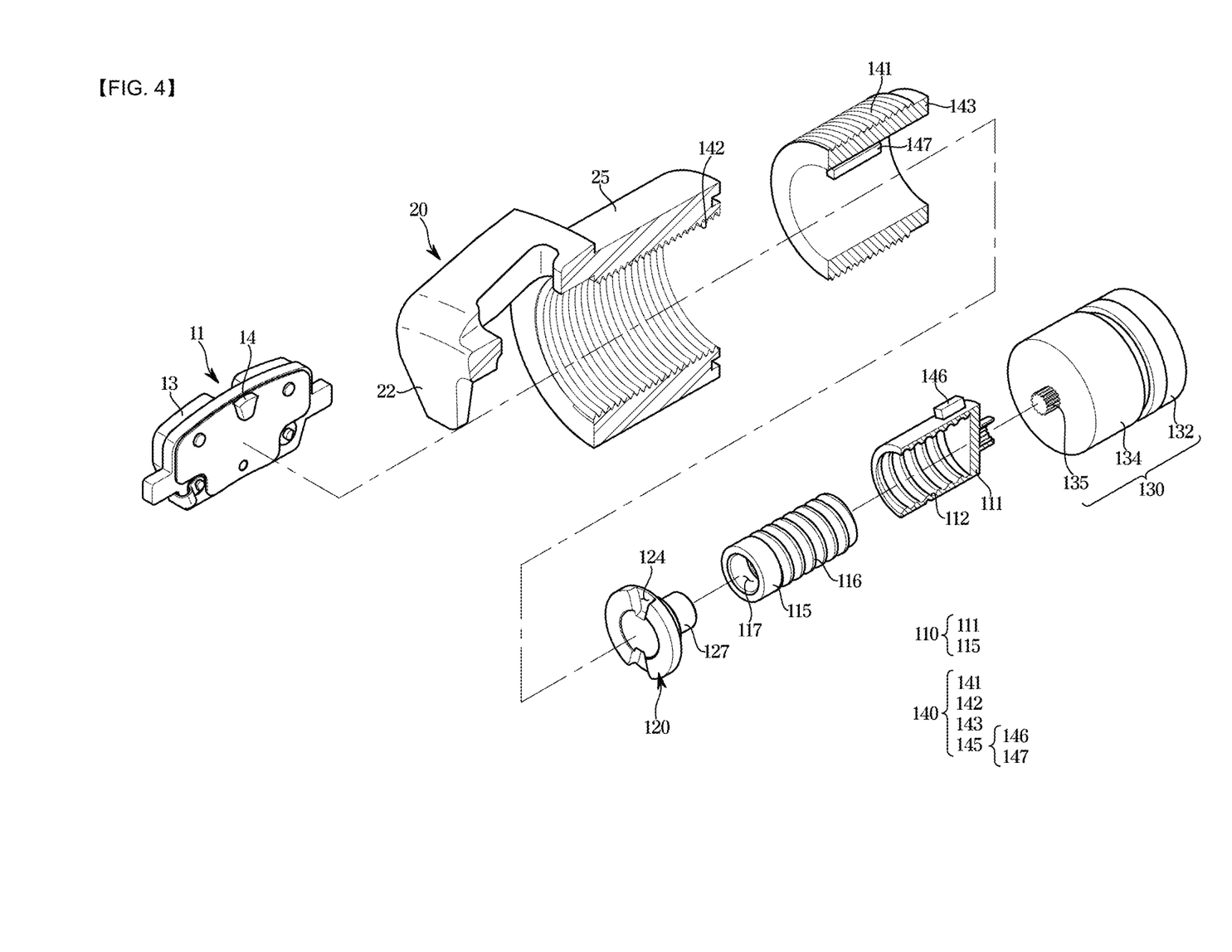
FIG. 4 is an exploded perspective view illustrating a main part of an electromechanical brake according to an embodiment of the disclosure.

FIGS. 3 and 4 are an enlarged lateral cross-sectional view and an exploded perspective view illustrating a main part of the electromechanical brake 100 according to an embodiment of the disclosure. Referring to FIGS. 1 to 4, the power converter 110 is provided inside the cylinder portion and may be mounted on the transfer portion 143 of the position adjuster 140 to be described later. Furthermore, the power converter 110 may receive power through the actuator 130 to press the inner pad plate 11 toward the disk. The power converter 110 may operate the position adjuster 140 to adjust a relative position of the caliper housing 20 with respect to the transfer portion 143, and the operation thereof will be described again below.

The power converter 110 may include a nut 111 rotating by receiving driving force from the actuator 130, a spindle 115 that is arranged inside the position adjuster 140 screw-coupled to the cylinder portion 25 to be described later and is screwed to the nut 111 to move forward by rotation of the nut 111 in a first direction or move backward by the rotation of the nut 111 in a second direction, and a plurality of balls (not shown) interposed between the nut 111 and the spindle 115. The power converter 110 may be provided as a ball-screw type conversion device for converting a rotational motion of the nut 111 into a linear motion.

The rotation in the first direction of the nut 111 to be described below refers to a rotational direction in which the spindle 115 is advanced (left side with reference to FIG. 2) by the rotation of the nut 111, and the rotation in the second direction of the nut 111 refers to a rotational direction in which the spindle 115 is retreated (right side with reference to FIG. 2) by rotation of the nut 111 as a rotation in the opposite direction to the first direction.

The nut 111 may be formed in a cylindrical shape in which one side thereof is opened so that the spindle 115 is inserted therein and an accommodation space is formed therein. Furthermore, an internal thread 112 may be formed on an inner circumferential surface of the nut 111 for coupling with the spindle 115. The spindle 115 is inserted into one side (a front side, which is the left side with reference to the drawings) of the nut 111, and the other side (a rear side, which is the right side with reference to the drawings) of the nut 111 is connected to the actuator 130 to receive the driving force. For example, the other side of the nut 111 may be coupled to an output shaft 135 output from the actuator 130 in a spline manner.

The spindle 115 has a predetermined length, and an external thread 116 that meshes with the internal thread 112 of the nut 111 via balls (not shown) may be formed on the outer circumferential surface thereof. Accordingly, the spindle 115 may move forward or backward according to the rotation of the nut 111 in the first direction or the second direction. At this time, the spindle 115 is provided in a state in which rotation is restricted in order to perform a linear motion according to the rotation in the first direction or in the second direction of the nut 111. The rotation of the spindle 115 may be prevented through the pressing member 120.

The pressing member 120 is coupled to the front side of the spindle 115. As shown in drawings, the pressing member 120 may have a press-fitting protrusion 127 protruding to be press-fitted to a press-fitting groove 117 formed in the front side of the spindle 115. In the front of the pressing member 120, a rotation prevention groove 124, which matches an anti-rotation protrusion 14, is formed so that the anti-rotation protrusion 14 protruding from the inner pad plate 11 is inserted and caught. Accordingly, as the rotation of the pressing member 120 is restricted by the inner pad plate 11, the rotation of the spindle 115 is restricted.

On the other hand, as described above, the pressing member 120 is shown and described as being press-fitted to the spindle 115, but is not limited thereto. The pressing member 120 and the spindle 115 are coupled in a spline manner, or the pressing member 120 may be coupled to the front side of the spindle 115 in a fastening manner such as bolting.

Furthermore, as an example of anti-rotation structure, the structure that the rotation prevention groove 124 is formed in the front of the pressing member 120 and the anti-rotation protrusion 14 is formed in the inner pad plate 11 has been shown and described, but is not limited thereto. Alternatively, the rotation prevention groove 124 may be formed in the inner pad plate 11, and the anti-rotation protrusion 14 may be formed in the front of the pressing member 120.

The actuator 130 may include a motor 132 and a reduction device 134 having a plurality of reduction gears, and may receive power from a power supply device installed in the vehicle to generate and provide driving force. The actuator 130 may be connected to the other end of the nut 111 to transmit the generated driving force to the nut 111 through the output shaft 135 of the reduction device 134 as a rotational movement. The actuator 130 may be installed outside the caliper housing 20 or in the vehicle, and the reduction device 134 may reduce power of the motor 132 to be provided the nut 111 by applying various structures such as a planetary gear assembly or a worm structure.

The position adjuster 140 compensates for wear of the friction pad 13 by adjusting the relative position of the caliper housing 20 with respect to the transfer portion 143, and is provided in the cylinder portion so that the power converter 110 is mounted.

The position adjuster 140 may include the transfer portion 143 provided between the power converter 110 and the cylinder portion 25, the first screw thread 141 formed on the outer circumferential surface of the transfer portion 143, the second screw thread 142 formed on the inner surface of the cylinder portion 25 and meshing with the first screw thread 141, and an adjuster 145 for moving the transfer portion 143 forward or backward by rotating the transfer portion 143 in the first direction or the second direction by the rotation of the nut 111. At this time, the forward or backward movement of the transfer portion 143 represents the movement of the caliper housing 20 as the cylinder portion 25 screwed with the transfer portion moves linearly when the transfer portion 143 is rotated by the nut 111. In other words, because the caliper housing 20 is provided slidably on the carrier 10 in a state in which the rotation thereof is restricted, the cylinder portion 25 integrally formed with the caliper housing 20 may linearly move, leading to the relative position of the caliper housing 20 being adjusted.

A first direction rotation of the transfer portion 143 will be described below is the same rotational direction as the first direction rotation of the nut 111 described above, and refers to a rotational direction in which the transfer portion 143 advances from the cylinder portion, but substantially the caliper housing 20 is retreated.

Furthermore, a second direction rotation of the transfer portion 143 is the same rotational direction as the second direction rotation of the nut 111 described above as a rotation opposite to the first direction, and refers to a rotational direction in which the transfer portion 143 moves backward from the cylinder portion, but substantially the caliper housing 20 is moved forward.

The transfer portion 143 is provided in a hollow cylindrical shape to surround an outer side of the nut 111 by a predetermined interval, and the first screw thread 141 is formed on the outer circumferential surface thereof. The transfer portion 143 may rotate together with the nut 111 when the nut 111 is rotated by the adjuster 145 to be described later. In other words, the first screw thread 141 of the transfer portion 143 is screwed with the second screw thread 142 of the cylinder portion 25 and the caliper housing 20 forming the cylinder portion 25 is coupled to the carrier 10 fixed to the vehicle body, so that rotation thereof is restricted. Accordingly, the caliper housing 20 moves linearly from the transfer portion 143 when the transfer portion 143 rotates.

The adjuster 145 may generate rotation of the transfer portion 143 through the nut 111 to advance or retreat the relative position of the caliper housing 20 with respect to the transfer portion 143. The adjuster 145 may include a first protrusion 146 protruding from the nut 111, and a second protrusion 147 protruding from the transfer portion 143. During the first direction rotation of the nut 111, the second protrusion 147 is caught by the first protrusion 146 to induce the first direction rotation of the nut 111 and the transfer portion 143, so that the relative position of the caliper housing 20 is retreats.

More specifically, referring to FIGS. 2 to 5, the first protrusion 146 may be formed on an outer circumferential surface of the nut 111. Furthermore, the first protrusion 146 may be formed to protrude from the outer circumferential surface of the nut 111 and spaced apart from an inner circumferential surface of the transfer portion 143.

Figure 5:
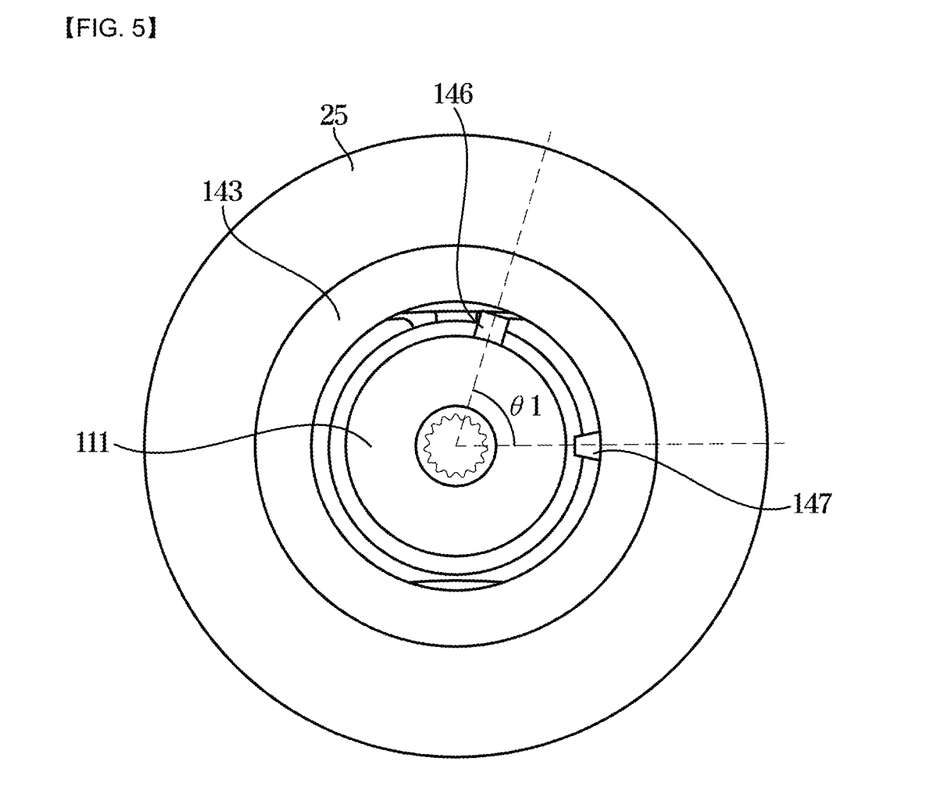
FIG. 5 is a cross-sectional view taken along A-A' direction of FIG. 3 and illustrating positions of first and second protrusions in a pre-braking state of the vehicle or in a braking release state of the vehicle.

The second protrusion 147 may be formed on the inner circumferential surface of the transfer portion 143. Furthermore, the second protrusion 147 may be formed to protrude from the inner circumferential surface of the transfer portion 143 and spaced apart from the outer circumferential surface of the nut 111.

The first and second protrusions 146 and 147 are formed at positions corresponding to each other, so that the first and second protrusions 146 and 147 may be provided to be caught each other when the nut 111 rotates in the first direction or the second direction.

The first and second protrusions 146 and 147 may be formed to protrude at an angle spaced apart from each other in a pre-braking state of the vehicle or in a braking release state of the vehicle.

Specifically, an angle between the first and second protrusions 146 and 147 (hereinafter referred to as first angle θ1) in the pre-braking state of the vehicle or in the braking release state of the vehicle is provided to be greater than a rotational angle of the first protrusion 146 (refer to FIG. 7, hereinafter referred to as second angle θ2) from in the braking release state to in a braking state of the vehicle. If the second angle θ2 is greater than the first angle θ1, the second protrusion 147 is caught by the first protrusion 146 to generate the first direction rotation of the nut 111 and the transfer portion 143 during a general vehicle braking. As a result, the caliper housing 20 moves backward from the transfer portion 143 and the finger portion 22 moves toward the outer pad plate 12. At this time, the power converter 110 also operates together, so fastening force between the pressing member 120 and the inner pad plate 11 is rapidly increased, so that braking force of the vehicle is greater than a braking amount required by the driver. Furthermore, a drag phenomenon may occur, which may decrease driving stability of the vehicle and fuel efficiency of the vehicle. Accordingly, by providing the first angle θ1 larger than the second angle θ2, the first and second protrusions 146 and 147 may be prevented from contacting each other during general vehicle braking, and thus the relative position of the caliper housing 20 with respect to the transfer portion 143 may be constantly maintained, and the driver's braking operability and driving stability may be promoted.

Referring to FIGS. 2 and 3 again, the detector 150 is provided to measure adhesion force or fastening force between the disk and the friction pad 13. The detector 150 may be provided as a force sensor that detects a load of the spindle 115 or the actuator 130 to measure the fastening force between the disk and the friction pad 13, but it is not limited thereto. The detector 150 may transmit the measured fastening force information of the friction pad 13 to the ECU, and the ECU may determine a wear or a drag of the friction pad 13 based on the measured fastening force information by the detector 150. Herein, the detector 150 is illustrated as being provided inside the front side of the pressing member 120 but it is not limited thereto. For example, the detector may be provided in the power converter 110 or the actuator 130 that receives reaction force when the pad plates 11 and 12 are pressed.

On the other hand, an unexplained reference numeral 30 refers to a boot. The boot 30 prevents foreign substances from being introduced into the cylinder portion 25 of the caliper housing 20. As shown in the drawings, the boot 30 may have one end thereof installed on the rear side of the cylinder portion 25 and the other end thereof installed on the actuator 130. The boot 30 has a corrugated shape to be stretchable and may be made of a rubber material to have elasticity. Accordingly, when the relative position of the caliper housing 20 is adjusted, the boot 30 expands or contracts and the function of preventing the inflow of foreign substances may be smoothly performed.

Although the boot 30 is shown to be installed to block only foreign substances between the cylinder portion 25 and the actuator 130, but it is not limited thereto, and a boot may be installed additionally so that one end thereof is installed on the pressing member 120 and the other end thereof is installed on the front side of the cylinder portion 25.

Hereinafter, operating states during the braking and the braking release using the electromechanical brake 100 as described above and a mode for compensating for wear of the friction pad 13 will be described.

Figure 6:
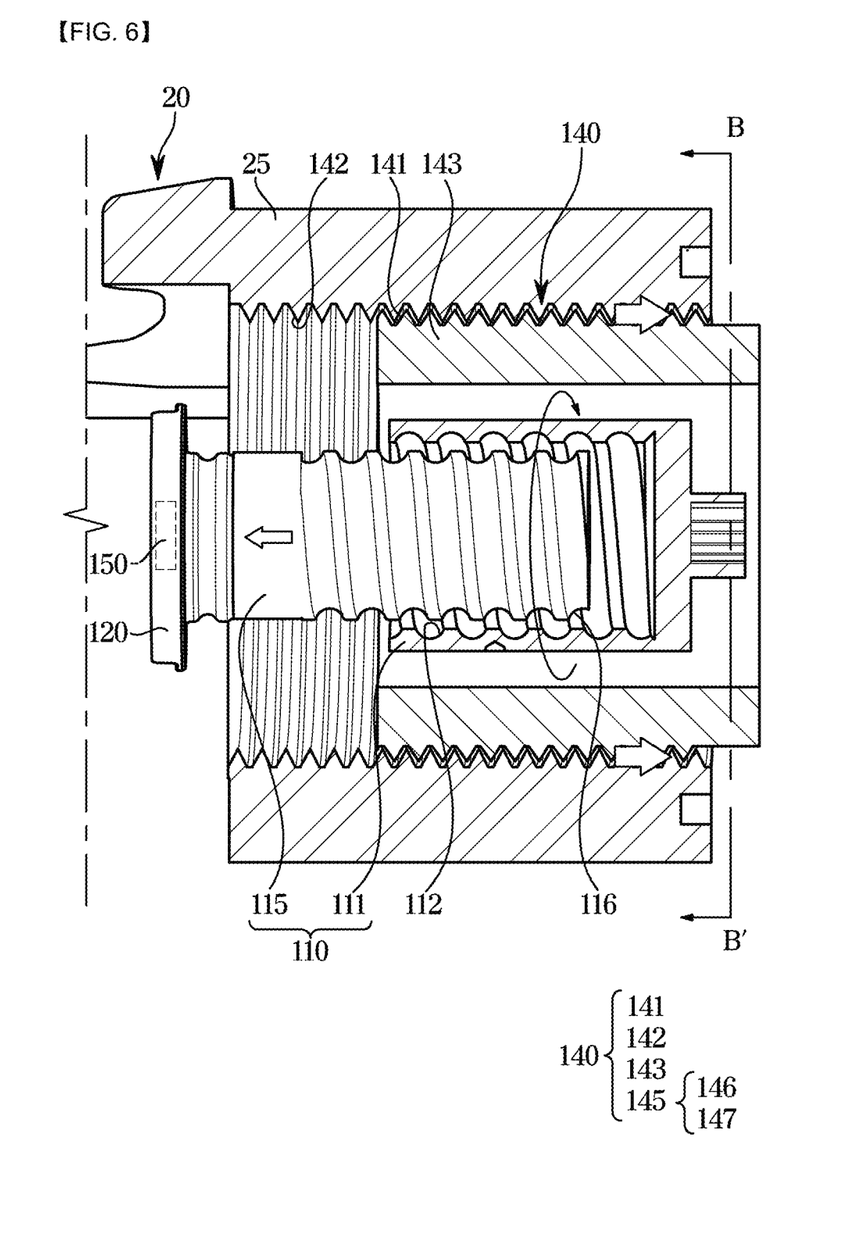
FIG. 6 is a side cross-sectional view illustrating an operation of an electromechanical brake according to an embodiment of the disclosure in a braking state of a vehicle.
Figure 7:
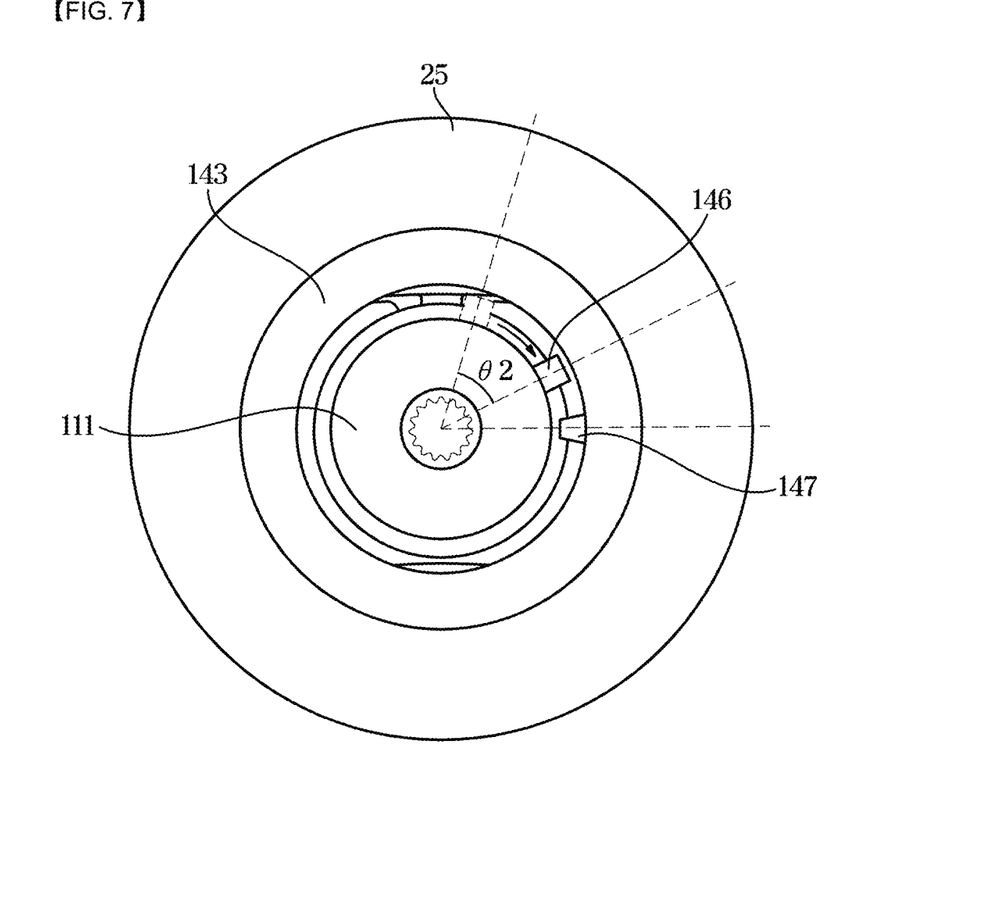
FIG. 7 is a cross-sectional view taken along B-B' direction of FIG. 6 and illustrating positions of the first and second protrusions in a braking state of the vehicle.

FIG. 6 is a side cross-sectional view illustrating the operation of the electromechanical brake according to an embodiment of the disclosure in the braking state of the vehicle, and FIG. 7 is a cross-sectional view taken along B-B' direction of FIG. 2 and illustrating the positions of the first and second protrusions in the braking state of the vehicle.

FIGS. 2, 3, and 5 to 7, when the driver applies a pedal effort to a brake pedal (not shown) to brake the vehicle, a pedal displacement sensor (not shown) converts the driver's intention to brake into an electrical signal and transmits the signal to the ECU. The ECU controls the operation of the actuator 130 so that the disc and the pair of pad plates 11 and 12 are in close contact to implement the braking of the vehicle. In other words, the electromechanical brake according to the embodiment of the disclosure may operate to in the braking state shown in FIGS. 6 and 7 from the braking release state (or the pre-braking state) shown in FIGS. 2, 3 and 5.

Specifically, during the braking of the vehicle, the nut 111 rotates in the first direction by the operation of the actuator 130 and while the spindle 115 moves forward in response to the rotation of the nut 111 in the first direction, the pressing member 120 also advances toward the inner pad plate 11. As the friction pad 13 mounted on the inner pad plate 11 approaches and closely adheres to the disk, fastening force is generated. In addition, by reaction force generated by pressing of the inner pad plate 11, as the caliper housing 20 is slid from the carrier 10 to move toward the disk side, the outer pad plate 12 approaches the disk by the finger portion 22 and presses the disk, thereby occurring the braking of the vehicle.

At this time, the first protrusion 146 provided on the nut 111 rotates by the second angle θ from the braking release state of the vehicle to the braking state of the vehicle according to the first direction rotation of the nut 111. However, because the first angle θ1 between the first and second protrusions 146 and 147 of the transfer portion 143 in the braking release state of the vehicle is greater than the second angle θ, the first and second protrusions 146 and 147 do not contact each other in a general braking situation. As a result, the relative position of the caliper housing 20 with respect to the transfer portion 143 may be constantly maintained.

Furthermore, when the caliper housing 20 slides by the reaction force according to the braking operation, the transfer portion 143 screwed with the cylinder portion 25 and the actuator 130 may move together. At this time, because the power converter 110 is provided in a state spaced apart from the transfer portion 143, the power converter 110 is not affected by the movement of the transfer portion 143, thereby maintaining a state connected to the actuator 130.

During the braking release of the vehicle, the vehicle may operate from the braking state shown in FIGS. 6 and 7 to the braking release state shown in FIGS. 2, 3 and 5. Specifically, the nut 111 rotates in the second direction by the operation of the actuator 130 and as the spindle 115 is retreated by the second direction rotation of the nut 111, the pressing member 120 is also spaced apart and retreated from the inner pad plate 11 together. Furthermore, as the caliper housing 20 is also returned to its original position, the friction pads 13 mounted on the pair of pad plates 11 and 12 are spaced apart from the disc, thereby the braking of the vehicle may be released. The first protrusion 146 provided on the nut 111 returns to its original position according to the second direction rotation of the nut 111.

Hereinafter, to maintain braking performance of the vehicle despite wear of the friction pad 13, a mode in which the electromechanical brake 100 according to the embodiment of the disclosure compensates for the wear of the friction pad 13 will be described.

Figure 8:
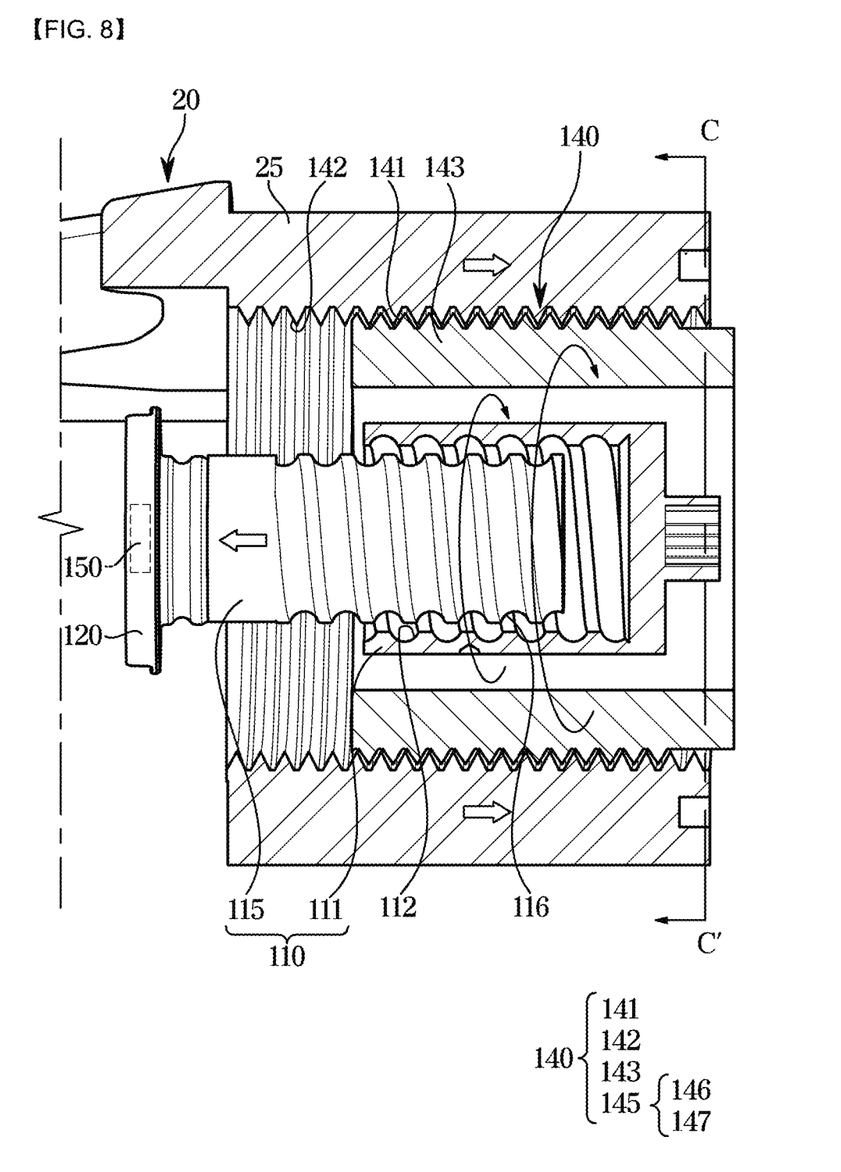
FIG. 8 is a side cross-sectional view illustrating an operation of an electromechanical brake according to an embodiment of the disclosure in order to compensate for wear of a friction pad.
Figure 9:
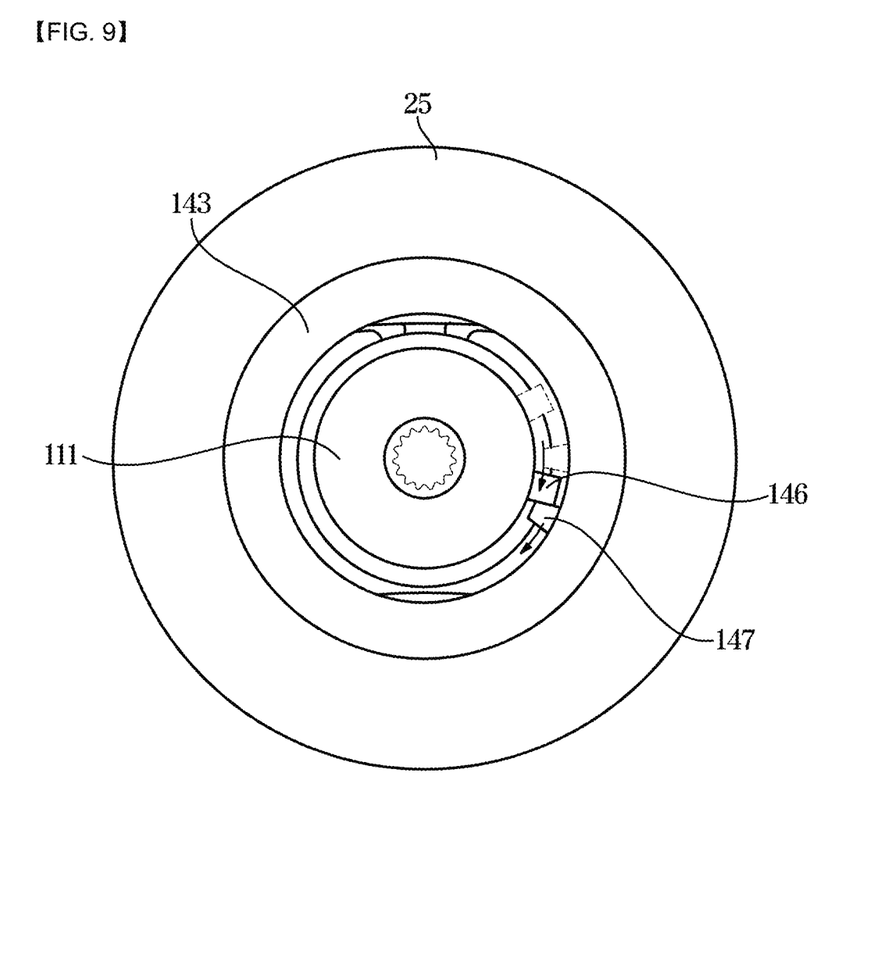
FIG. 9 is a cross-sectional view taken along C-C' direction of FIG. 8 and illustrating positions of the first and second protrusions.

FIG. 8 is a side cross-sectional view illustrating the operation of an electromechanical brake according to an embodiment of the disclosure in order to compensate for wear of the friction pad, and FIG. 9 is a cross-sectional view taken along C-C' direction of FIG. 8 and illustrating the locations of the first and second protrusions.

Referring to FIGS. 8 and 9, in response to that the adhesion force or fastening force between the disk and the pad plates 11 and 12 measured by the detector 150 in a general braking operation state is smaller than a predetermined value in a normal range, the ECU (not shown) determines that wear is present in the friction pad 13 to enter a mode for compensating for the wear.

For example, in response to determining that the friction pad 13 is worn, the ECU rotates the nut 111 in the first direction by controlling the operation of the actuator 130 in order to enter a wear compensation mode. At this time, the ECU generates an additional first direction rotation (more than the first angle θ1 in FIG. 5) greater than the first direction rotation of nut 111 in the general braking state (refer to the second angle θ2 in FIG. 7). As a result, the first protrusion 146 provided on the nut 111 rotates in contact with the second protrusion 147 provided on the transfer portion 143. Because the second protrusion 147 is caught by the first protrusion 146 to rotate together in the first direction, the nut 111 and the transfer portion 143 also rotate in the first direction. The relative position of the cylinder portion 25 with respect to the transfer portion 143 may be retreated by the first direction rotation of the nut 111 and the transfer portion 143. In other words, as the relative position of the caliper housing 20 with respect to the transfer portion 143 moves backward, the outer pad plate 12 moves together toward the disk side, thereby compensating for the wear of the friction pad 13.

After the completion of the mode for compensating for the wear of the friction pad 13, the electromechanical brake 100 according to the embodiment of the disclosure returns to the braking release state of the vehicle or the pre-braking state of the vehicle.

Figure 10:
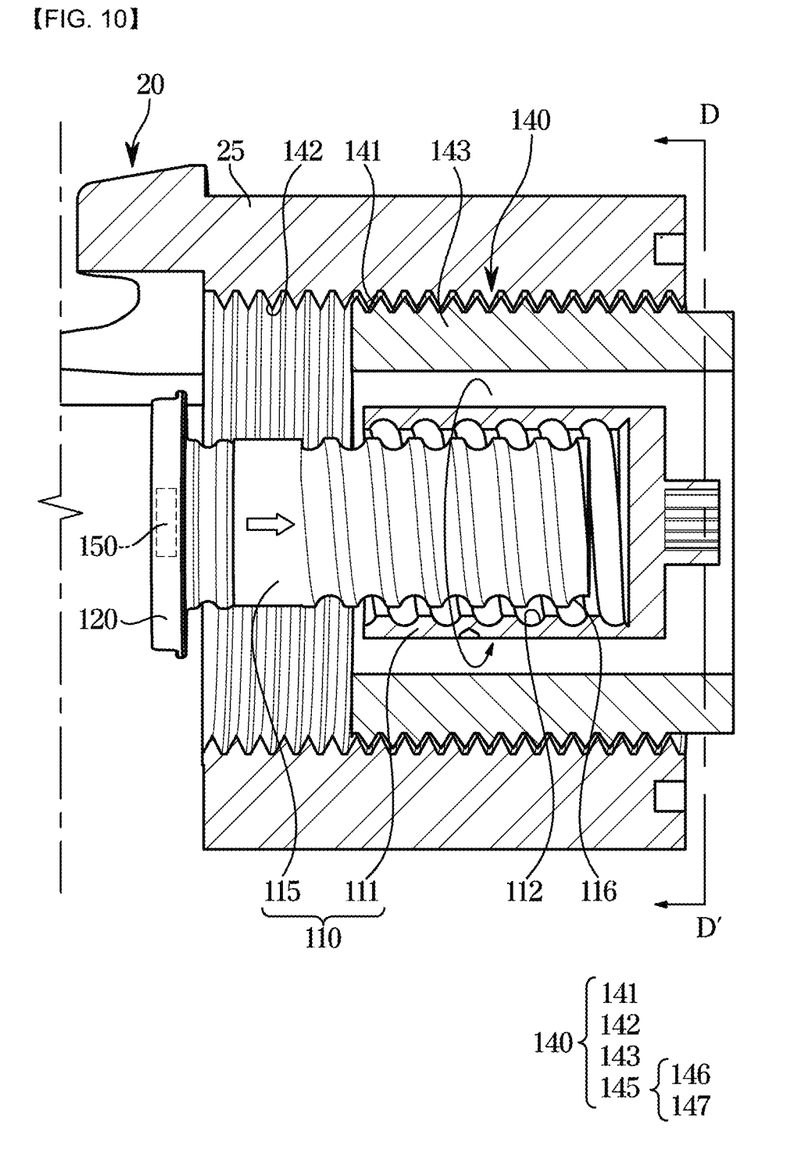
FIG. 10 is a side cross-sectional view illustrating an operation of an electromechanical brake according to an embodiment of the disclosure in a braking release state of a vehicle after wear compensation of a friction pad.
Figure 11:
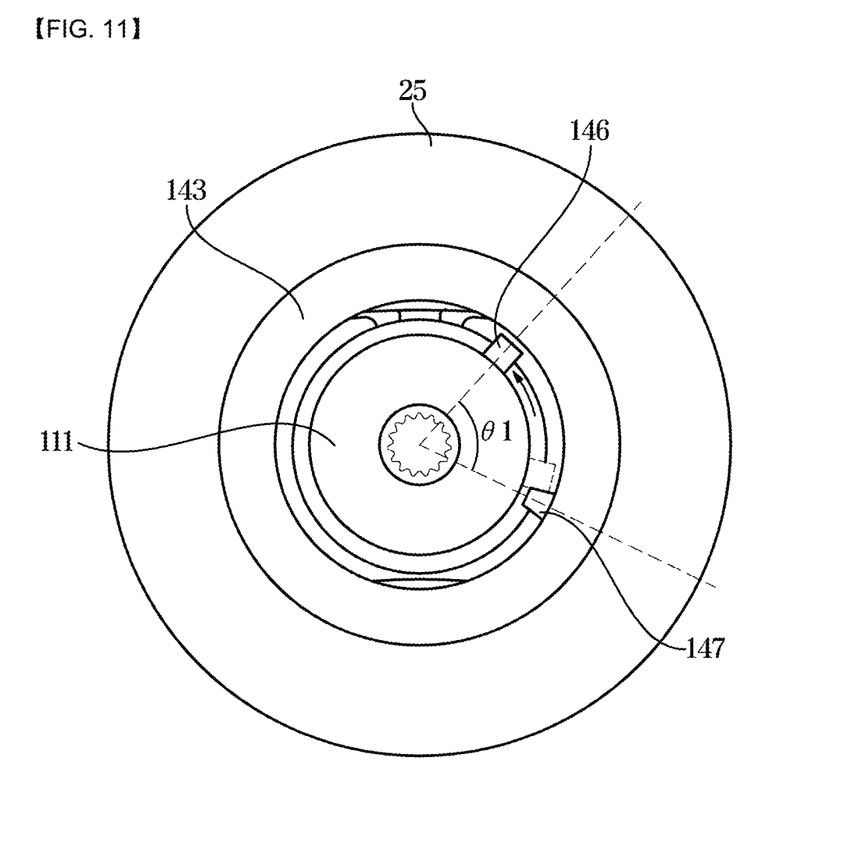
FIG. 11 is a cross-sectional view taken along D-D' direction of FIG. 10 and illustrating positions of the first and second protrusions in a braking release state of a vehicle after compensating for wear of a friction pad.

FIG. 10 is a cross-sectional side view illustrating the operation of the electromechanical brake according to an embodiment of the disclosure in the braking release state of the vehicle after compensating for wear of the friction pads, and FIG. 11 is a cross-sectional view taken along D-D' direction of FIG. 10 and illustrating the locations of the first and second protrusions in the braking release state of the vehicle after compensating for the wear of the friction pad.

Referring to FIGS. 10 and 11, after compensating for the wear of the friction pad 13, the ECU generates the second direction rotation of the nut 111 by controlling the operation of the actuator 130. Specifically, the actuator 130 rotates the nut 111 in the second direction to return the braking release state of the vehicle. In other words, the ECU may rotate the nut 111 in the second direction so that the first protrusion 146 of the nut 111 may maintain the first angle θ1 with the second protrusion 147.

Accordingly, the spindle 115, which is returned to its original position after performing the wear compensation mode of the friction pad 13, may perform the braking when the braking of the vehicle is operated again according to the first protrusion 146 of the nut 111 rotates by the second angle θ2. At this time, the braking operation is performed while compensating for the wear of the friction pad 13, so that the braking of the vehicle may stably performed.

On the other hand, after the wear compensation, the nut 111 may be returned to the pre-braking state of the vehicle. In other words, the additional first direction rotation of the nut 111 occurs in the wear compensation mode, but the ECU may return the spindle 115 to its original position by rotating the nut 111 in the second direction by an amount corresponding to that of the additional first direction rotation generated in the wear compensation mode.

As is apparent from the above, the electromechanical brake according to the embodiments of the disclosure may maintain and improve braking performance of the vehicle despite the wear of the friction pad attached to the pad plate.

Furthermore, the electromechanical brake according to the embodiments of the disclosure may improve applicability of the vehicle by reducing size and weight, and promote space utilization of the vehicle.

Furthermore, the electromechanical brake according to the embodiments of the disclosure may easily compensate for wear of the friction pad with a simple structure.

As described above, the exemplary embodiments of the present disclosure have thus far been described with reference to accompanying drawings. It will be obvious to those of ordinary skill in the art that the present disclosure may be practiced in other forms than the exemplary embodiments as described above without changing the technical idea or essential features of the present disclosure. The above exemplary embodiments are only by way of example, and should not be interpreted in a limited sense.

What is claimed is:

1. An electromechanical brake, comprising:
  a power converter including a nut provided in a cylinder portion of a caliper housing slidably coupled to a carrier and configured to rotate by receiving a driving force from an actuator, and a spindle connected to the nut and configured to move forward or backward by rotation of the nut in a first direction or a second direction;
  a pressing member coupled to a front side of the spindle and configured to press a pad plate; and a position adjuster screwed into the cylinder portion so that the power converter is mounted and configured to adjust a relative position of the caliper housing in response to an operation of the power converter.

2. The electromechanical brake of claim 1, wherein the position adjuster comprises:
   a transfer portion provided between the power converter and the cylinder portion;
   a first screw thread formed on an outer circumferential surface of the transfer portion;
   a second screw thread formed on an inner circumferential surface of the cylinder portion and meshing with the first screw thread; and
   an adjuster configured to rotate the transfer portion in the first direction or the second direction by rotation of the nut to move backward or forward a relative position of the caliper housing with respect to the transfer portion.

3. The electromechanical brake of claim 2, wherein the transfer portion is provided in a hollow cylindrical shape to surround an outer side of the nut to be spaced apart from the nut by a predetermined interval.

4. The electromechanical brake of claim 2, wherein the adjuster comprises:
   a first protrusion protruding from the nut; and
   a second protrusion formed to protrude from the transfer portion and configured to move the relative position of the caliper housing backward when the nut rotates in the first direction by being caught by the first protrusion to induce the first direction rotation of the nut and the transfer portion.

5. The electromechanical brake of claim 4, wherein a first angle between the first protrusion and the second protrusion in a braking release state of a vehicle is greater than a second angle at which the first protrusion rotates from the braking release state of the vehicle to a braking state of a vehicle.

6. The electromechanical brake of claim 4, wherein the first protrusion is formed to protrude from an outer circumferential surface of the nut to be spaced apart from an inner circumferential surface of the transfer portion, and
   the second protrusion is formed to protrude from the inner circumferential surface of the transfer portion to be spaced apart from the outer circumferential surface of the nut.

7. The electromechanical brake of claim 4, further comprising:
   an electronic control unit (ECU) configured to control an operation of the actuator; and
   a detector configured to measure fastening force between the pad plate and the disk rotating together with a wheel of a vehicle.

8. The electromechanical brake of claim 1, wherein the pressing member is press-fitted or bolted to the front side of the spindle in order to move together with the spindle.

9. The electromechanical brake of claim 1, wherein the pressing member is provided with an anti-rotation means so that rotation thereof is restricted, and
   the anti-rotation means comprises:
   an anti-rotation groove or protrusion formed in a front of the pressing member facing the pad plate; and
   a rotation prevention protrusion or groove formed on a rear side of the pad plate facing the pressing member, the rotation prevention protrusion or groove matching the anti-rotation groove or protrusion.

10. The electromechanical brake of claim 1, further comprising: a boot provided to prevent an inflow of foreign substances into the cylinder portion of the caliper housing.

* * * * *